(12) United States Patent
Suko et al.

(10) Patent No.: US 8,328,670 B2
(45) Date of Patent: Dec. 11, 2012

(54) ENGAGEMENT CHAIN (75) Inventors: Tomoo Suko, Osaka (JP); Kohei Nakanishi, Osaka (JP); Tomoyuki Saji, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 330 days.

(21) Appl. No.: 12/508,324

(22) Filed: Jul. 23, 2009

(65) Prior Publication Data
US 2010/0051424 A1 Mar. 4, 2010

(30) Foreign Application Priority Data

Aug. 29, 2008 (JP) ................................. 2008-221677

(51) Int. Cl.
B65G 17/38 (2006.01)
(52) U.S. Cl. ......... 474/152; 474/217; 254/358; 254/385
(58) Field of Classification Search .................. 474/152, 474/217; 254/358, 385
See application file for complete search history.

(56) References Cited

U.S. PATENT DOCUMENTS

| 2,375,461 | A | * | 5/1945 | Bender | 52/108 |
| 2,554,300 | A | * | 5/1951 | Hayakawa | 52/108 |
| 2,574,657 | A | * | 11/1951 | Pierce | 254/1 |
| 3,012,635 | A | * | 12/1961 | Blain | 187/250 |
| 3,645,146 | A | * | 2/1972 | Nagin | 74/89.21 |
| 4,116,081 | A |   | 9/1978 | Luttrell et al. | |
| 5,355,643 | A | * | 10/1994 | Bringolf | 52/108 |
| 5,803,418 | A | * | 9/1998 | Bringolf et al. | 248/158 |
| 7,270,619 | B2 | * | 9/2007 | Bourc'His | 474/202 |

FOREIGN PATENT DOCUMENTS

| JP | S51-131060 | 11/1976 |
| JP | S53-146065 | 12/1978 |
| JP | 3370928 | 11/2002 |

OTHER PUBLICATIONS

JP2008-221677, Oct. 21, 2010, Office Action.

* cited by examiner

*Primary Examiner* — William E Dondero
*Assistant Examiner* — Michael Riegelman
(74) *Attorney, Agent, or Firm* — Maschoff Gilmore & Israelsen (57) ABSTRACT

An engagement chain in which a buckling strength of a pair of engagement chains engaged with each other is improved without blocking engagement operations between inner tooth plates and between outer tooth plate. The chain includes inner tooth plates, bushes, outer tooth plates and connecting pins. Buckling limiting flat surfaces of adjoining plates are brought into surface contact with each other when opposing segments of the chain are integrated together by driving sockets.

4 Claims, 9 Drawing Sheets

ENGAGEMENT CHAIN

CROSS-REFERENCE TO RELATED APPLICATIONS

The entire disclosure of Japanese Patent Application No. 2008-221677 filed Aug. 29, 2008 is expressly incorporated herein by reference.

BACKGROUND OF THE INVENTION

1. The Field of the Invention

The present invention relates to an engagement chain. More particularly, the present invention relates to driving device which uses an engagement chain to drive articles forward and backward in parallel with a set surface. Such hoisting and lowering devices may be used as production facilities in various kinds of production fields, transfer facilities in the transportation field, care facilities in the medical welfare field, stage facilities in the art field, and the like.

2. The Relevant Technology

Figure 1:
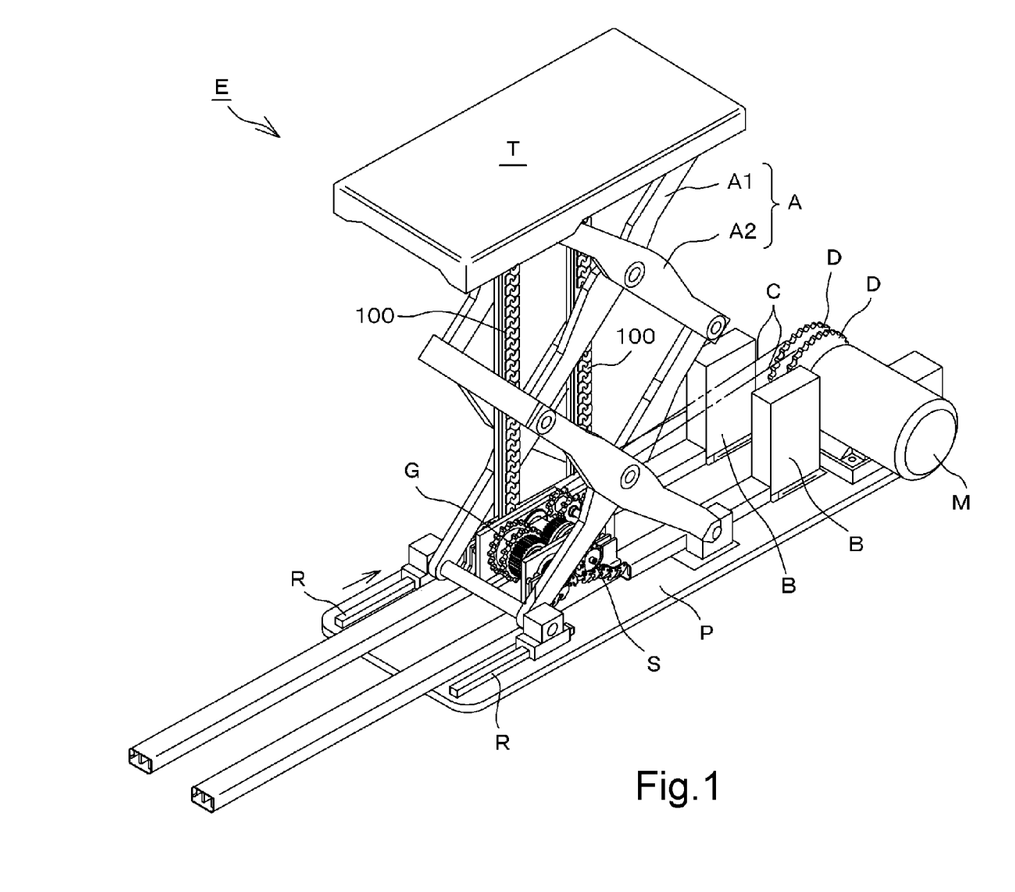
FIG. 1 illustrates a hoisting and lowering device with an engagement chain, according to a first embodiment of the present invention.

One example of a driving device is a so called chuck chain, which hoists and lowers articles, such as heavy articles, using a pair of engagement chains, which are integrally formed with the device, and which are used to lift and lower the articles, while being engaged with each other, such as the chain described in Japanese Patent Publication No. JP-3370928, which is shown in FIG. 1.

Figure 9:
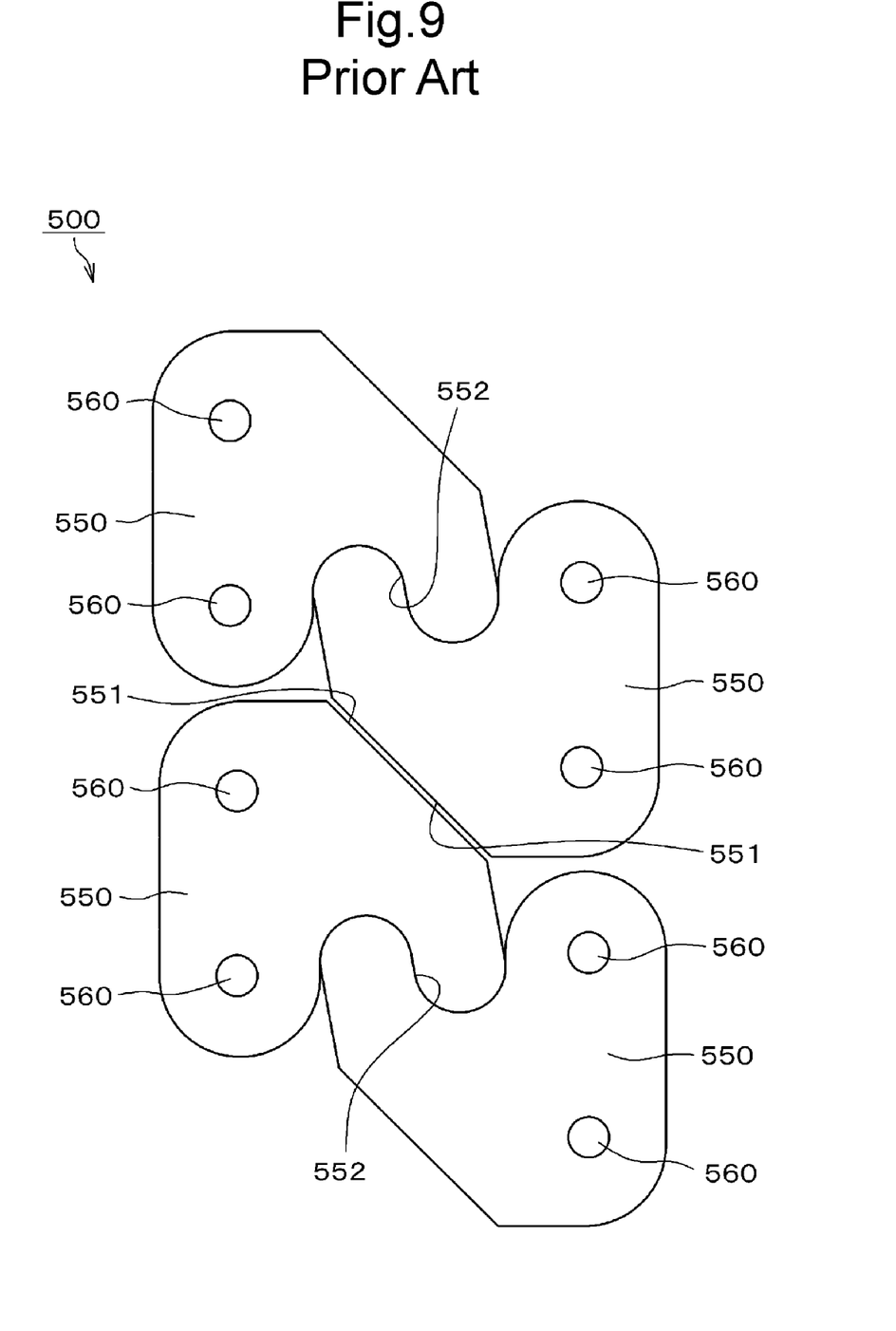
FIG. 9 is a plan view showing an engagement state between outer tooth plates in a conventional engagement chain.

In a conventional engagement chains currently known in the art, such as the engagement chain 500 shown in FIG. 9, various modifications to the shape of hook 552 formed in respective link plates 550, the pitch between pins, the pitch between bushes and the like, have been made. Despite these variations, however, most engagement chains continued to use the same shape for the buckling limiting flat surface 551 formed on the opposite side of the hook surface. As shown in FIG. 9, most form plate shapes are formed so a space is produced between adjoining buckling limiting flat surfaces 551 when a pair of engagement chains 500 are engaged with each other.

One problem with the conventional engagement chain 500, however, is that a compression force between link plates 550, or a relative shift between link plates opposed to each other may occur along the above-mentioned bucking limiting flat surface 551 because of the space generated between the bucking limiting flat surfaces 551. Furthermore, the space between the buckling limiting flat surfaces 551 reduces the rigidity of a pair of engagement chains 500 engaged with each other. This results in reduced buckling strength in the combined engagement chains 500.

One solution to the reduced buckling strength, is to reduce the influence by not forming a space between buckling limiting flat surfaces 551, such as when the engagement chain 500 is used in a driving device in a floor setting form, which is uses a floor surface as a setting surface, as described in the Japanese Patent Publication No. 3370928. However, when the engagement chain 500 is used in a driving device using a suspended form which uses a ceiling surface as a setting surface or in a driving device in a cantilever supporting form which uses a vertical wall surface as a setting surface, the problem can become significant.

Accordingly, there is a need for an engagement chain which solves these conventional problems by providing an engagement chain which has an improved buckling strength when two segments of the engagement chain are engaged with each other without blocking engagement operations between inner tooth plates and between outer tooth plates.

Further, there is a need for an engagement chain which has reduced working load on molding of inner tooth plates and outer tooth plates while reliably maintaining the chain engagement position of the engaged segments of the engagement chain, even if the engaged segments are used a driving device in a suspended form, which uses a ceiling surface as a setting surface, or a driving device in a cantilever supporting form, which uses a vertical wall surface as a setting surface.

The subject matter claimed herein is not limited to embodiments that solve any disadvantages or that operate only in environments such as those described above. Rather, this background is only provided to illustrate one exemplary technology area where some embodiments described herein may be practiced

BRIEF SUMMARY OF THE INVENTION

These and other limitations are overcome by embodiments of the invention which relate to a new design for an engagement chain, which has improved buckling strength and durability.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

A first embodiment of the invention is an engagement chain including a plurality of chain segments. Each chain segment includes at least one inner link unit, each inner link unit comprising a pair of right and left hook-shaped inner tooth plates, each having a front and rear pin hole, and a pair of front and rear bushes press-fitted into said inner tooth plates, so that the pair of right and left hook-shaped inner tooth plates are connected to each other in a longitudinal direction, and hook-shaped outer tooth plates disposed on the outermost sides of the chain in the chain width direction, the outer tooth plates each having a front and rear pin hole and being connected to the at least one inner link unit by pairs of front and rear connection pins press-fitted into pairs of front and rear pin holes of the hook-shaped outer tooth plates and the front and rear pin holes of the hook-shaped inner tooth plate. The inner tooth plates and outer tooth plates of corresponding segments of the chain oppose to each other when driven by a pair of driving sprockets which engage with the bushes, and become respectively engaged with the inner tooth plates and outer tooth plates the opposing chain segment in a half pitch-shifted state in a longitudinal direction of the chain so that the corresponding chain segments are integrated with each other, and wherein the inner tooth plates and said outer tooth plates are respectively disengaged from each other and branched by said pair of driving sprockets. A buckling limiting flat surfaces is formed on each of the inner tooth plates and outer tooth plates so as to hold a chain engagement position, and wherein the buckling limiting flat surfaces of adjoining chain segments are brought into surface contact with each other when the adjoining chain segments are integrated with corresponding segments by the driving sprockets.

One benefit of aspects of the invention is that the engagement chain may be quickly driven forward and backward in accordance with a rotation of the driving sprocket. Furthermore, since the buckling limiting flat surfaces of the inner tooth plates and outer tooth plates are brought into contact when two chain segments are in a chain engagement position, the relative shift or compression force between facing inner plates and the opposing facing outer plates along each buckling limiting flat surface can be reliably suppressed. Thus improvement to the rigidity in an engaged segment of an engagement chain results in improved bucking strength.

Furthermore, the chain engagement position of two engaged segments of the engagement chain can be reliably held even if the chains are used in a driving device in a suspended form or in a cantilever supporting form. As a result, it is possible to have a stabilized forward and backward movement as the articles are driven in the driving device.

Further, as mentioned above, since the buckling strength of a pair of engagement chains is improved, the engagement chains are stably moved forward and backward from driving sprockets to farther positions, while avoiding the creation of a partial excessive load within the engagement chain so that a chain endurance can be improved and a miniaturization of the chain size and weight reduction of the chain can be obtained.

As described above, since the compression force between the inner tooth plates and between the outer tooth plates are suppressed, it is further possible to suppress the generation of drive noise during a chain operation. And since no spaces are formed between buckling limiting flat surfaces, the entire length of the chain is maintained at a fixed length so that a positioning accuracy of articles to be driven can be improved.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to an engagement chain. More particularly, the present invention relates to an engagement chain which may be incorporated into a hoisting and lowering device, which hoists and lowers a hoisting and lowering table in parallel with a set surface.

An engagement chain 100, which is a first embodiment of the present invention, will be described with reference to drawings. The engagement chain 100 is incorporated into a hoisting and lowering device with an engagement chain E, which is set on an operating floor surface in a stationary state so as to hoist and lower a table T on which articles, such as heavy articles (not shown), are loaded.

Figure 2:
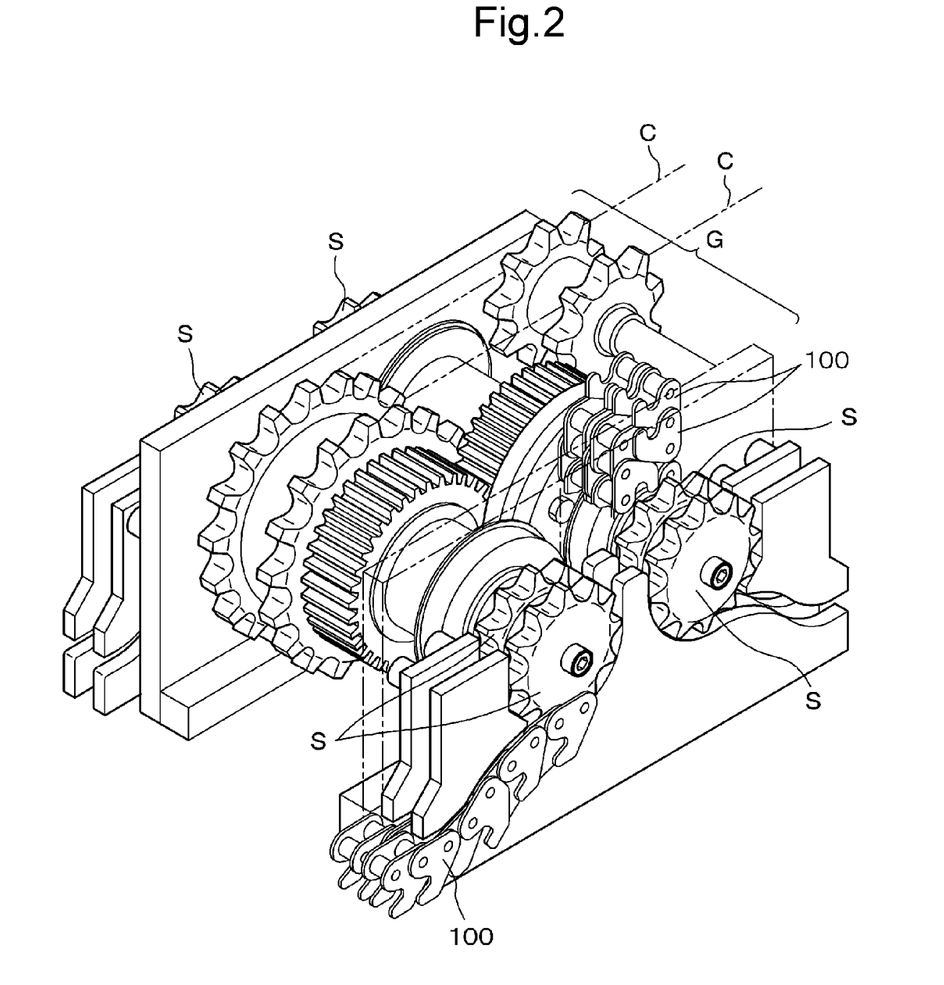
FIG. 2 is a perspective view of an engagement chain, with the hoisting and lowering table and a pantograph arm are removed.

The hoisting and lowering device with engagement chain E comprises, as shown in FIGS. 1 and 2, a base plate P mounted on a setting surface where the table T is raised and lowered in parallel with the setting surface, a pair of driving sprockets S which rotate forward and reverse about a pair of rotation shafts arranged in parallel with the base plate P in opposite directions while facing each other, a pair of corresponding segments of the engagement chain 100 which are disengaged from the driving sprockets S to raise and lower the T, the table T being securely attached to an upper end of the engagement chains 100, and a driving motor M, which drives the pair of driving sprockets S.

A pair of driving sprockets D are coaxially arranged on an output shaft side of the driving motor M. A pair of power transmission chains C composed of roller chains transmit power from the driving sprockets D to a side of a pair of driving sprockets S. A synchronizing gear group G transmits power from the pair of power transmission chains C to the pair of driving sprockets S so that one directional rotation speed is changed and positive and reverse rotations are performed in opposite directions. Upper and lower arms A are connected so as to form hoisting and lowering auxiliary guide means. The arms A are composed of an inner arm A1 and an outer arm A2 so as form a so-called X-shaped pantograph arm, which is provided between the T and a setting surface side base plate P. A slide rail R is formed so that lower end of the inner arm A1 is able to slide accordance with a hoisting and lowering operation. A winding type chain accommodating box B accommodates one of a pair of engagement chain segments which 100 are disengaged from each other.

Figures 3A, 3B:
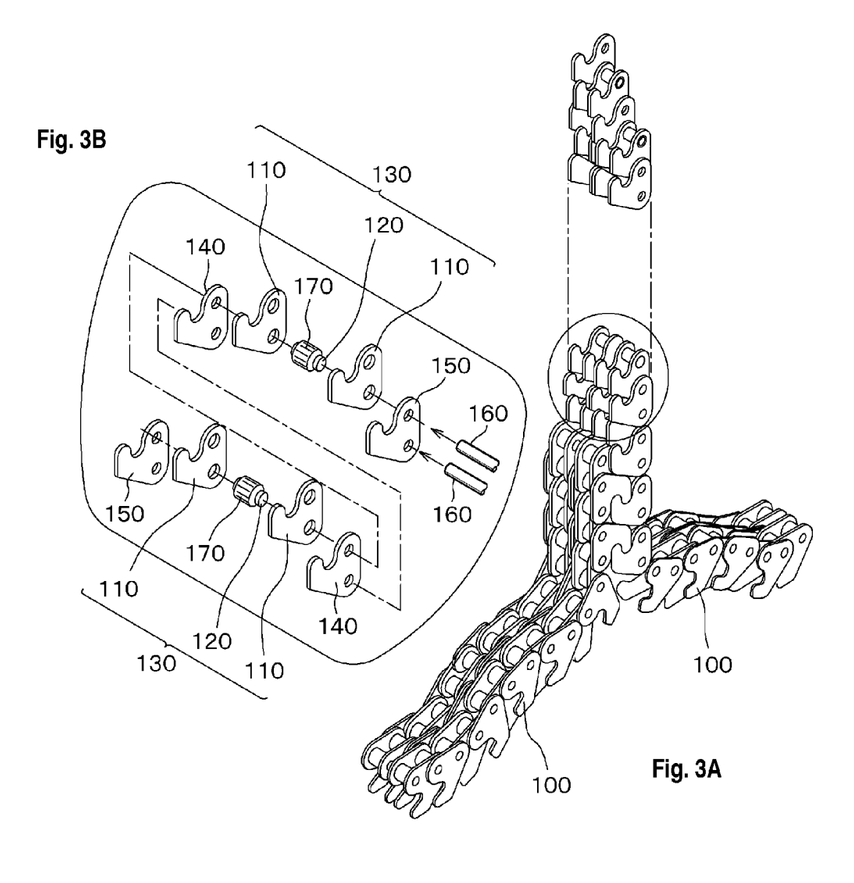
FIG. 3A shows the engagement chain of the first embodiment of the invention and FIG. 3B is a partially enlarged view showing the engagement chain of the first embodiment of the invention.
Figure 4:
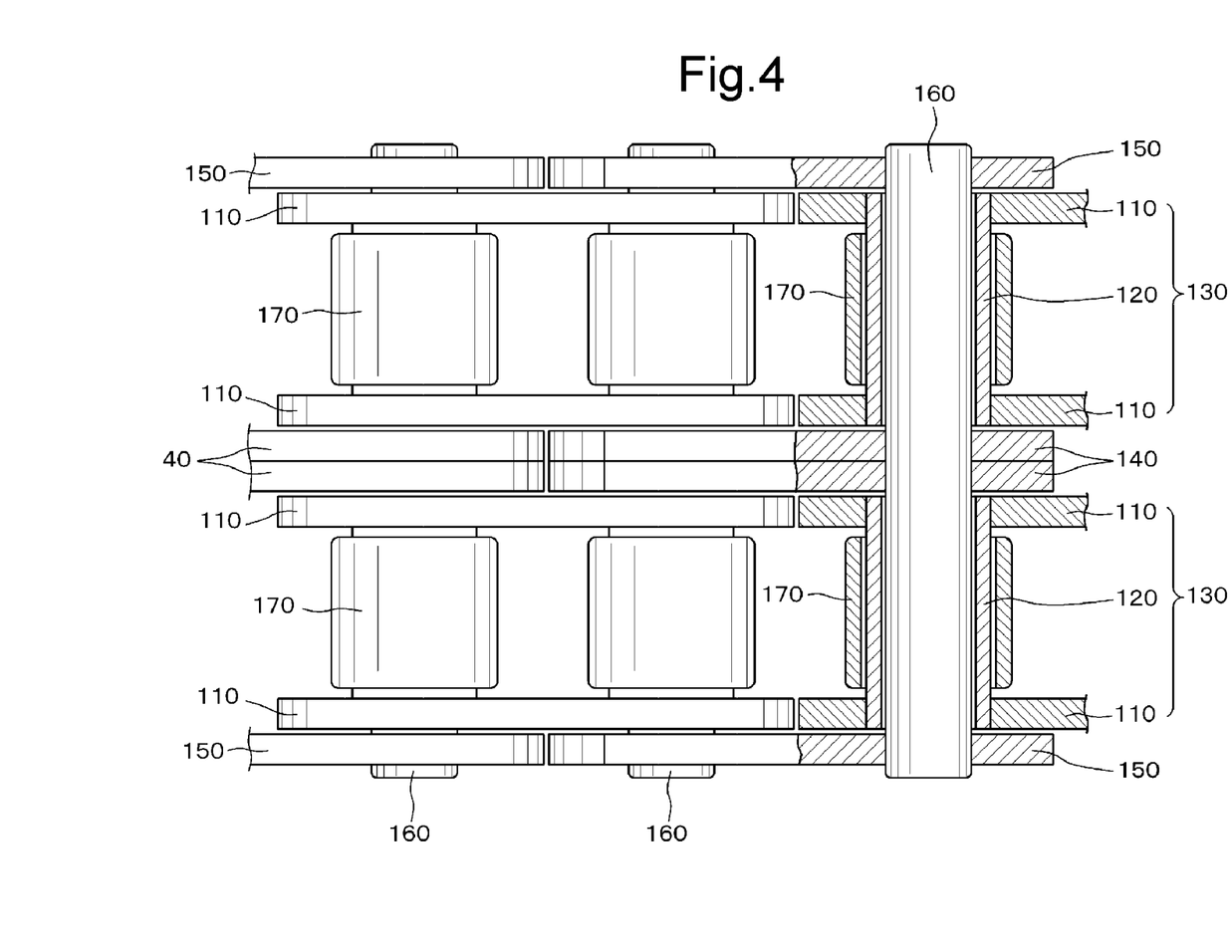
FIG. 4 is a partial cross-sectional view illustrating the engagement chain of the first embodiment of the invention.

As shown in FIGS. 3-4, the engagement chain 100 includes inner link units 130 each comprising a pair of right and left spaced inner tooth plates 110 and a pair of front and rear bushes 120 press-fitted into the inner tooth plates 110. The inner link units 130 are arranged in parallel with each other with two intermediate tooth plates 140 formed therebetween in the chain width direction, and a number of inner link units 130 are connected to each other in the longitudinal direction of the chain by pairs of front and rear connecting pins 160 press-fitted into pairs of front and rear pin holes of outer tooth plates 150 disposed on the outermost sides in the chain width direction. Rollers 170 are fitted onto outer circumferences of the bushes 120.

Because the inner link units 130 are arranged in parallel with each other in the chain width direction, an inner tooth plate 110, an intermediate tooth plate 140 and an outer tooth plate 150, of one segment of the engagement chain 100 engages with the inner tooth plate 110, intermediate tooth plate 140, and an outer tooth plate 150, of an opposing segment of the engagement chain 100, so as to form a pair of corresponding segments of the engagement chain 100. The engagement utilizes a hook design, or so-called chuck-shaped design, which may be repeated for a plurality of chain segments, so that the resulting chain is strong and capable of resisting buckling in the chain width direction. The engagement chain is also able to improve the engagement balance with driving sprockets S in the chain width direction.

Further, the pair of corresponding segments of the engagement chain 100 are designed so as to correspond to the above-mentioned pair of driving sprockets S and each other, as shown in FIGS. 2 to 3, so that respectively facing inner tooth plates 110, outer tooth plates 150 and intermediate tooth plates 140 may be engaged with each other to be integrally hoisted in a self-standing state. Then the pair of corresponding segments of the engagement chain 100, the inner tooth plates 110, the outer tooth plates 150 and the intermediate tooth plates 140 are disengaged from each other and branched when deflecting from the vertical direction to the horizontal direction using another pair of driving sprockets S.

Now, the shape of the inner tooth plate 110, intermediate tooth plate 140, and outer tooth plate 150, which are the most characteristic in engagement chain 100 of the present example, will be described in more detail with reference to FIGS. 5-8.

Figure 5:
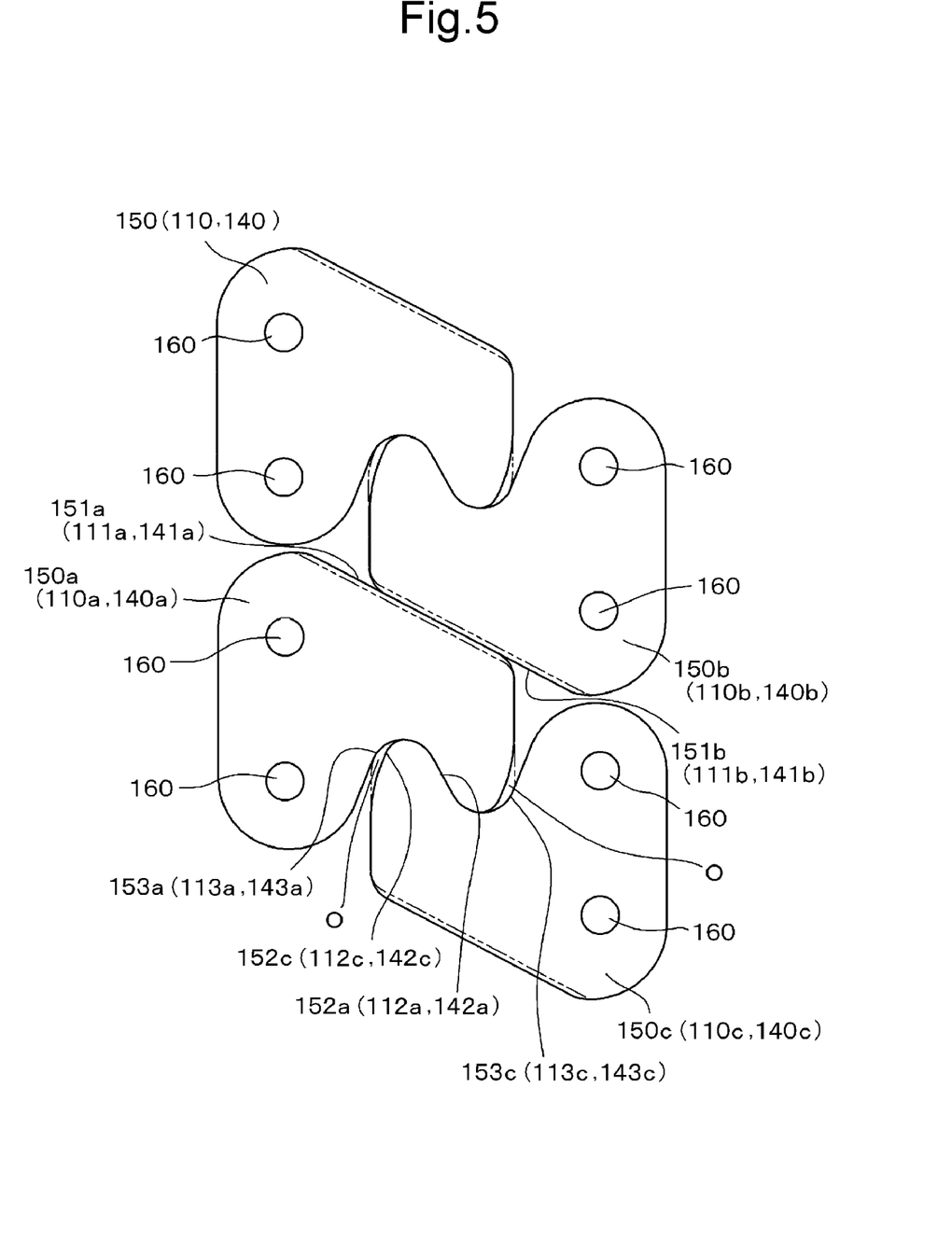
FIG. 5 is a plan view showing the outer tooth plates of the engagement chain of the first embodiment of the invention engaged with each other.

First, the outer tooth plate 150 has a buckling limiting flat surface 151 extending from a plate proximal end portion, a hook-shaped engagement surface 152 formed in the opposite side of the buckling limiting flat surface 151, and a curved engagement receiving surface 153 formed at a region between the hook-shaped engagement surface 152 and the plate proximal end portion.

As shown in FIG. 5, when a pair of corresponding segments of the engagement chain 100 are engaged with each other, a buckling limiting flat surface 151a formed on an outer tooth plate 150a is brought into surface contact with a buckling limiting flat surface 151b formed on a preceding outer tooth plate opposite to the outer tooth plate 150a whereby a chain engagement position is held.

As shown in FIG. 5, the buckling limiting flat surfaces 151 are bulgedly formed so that when the buckling limiting flat surface 151a and the buckling limiting flat surface 151b are bought into surface contact with each other, these buckling limiting flat surfaces 151a and 151b interfere with each other and are elastically deformed. This deformity is shown by the dotted line shown in FIG. 5.

As shown in FIG. 5, the above-described hook-shaped engagement surface 152 and the curved engagement receiving surface 153 are designed so that when a pair of corresponding segments of the engagement chain 100 are engaged with each other, a hook shaped engagement surface 152a and a curved engagement receiving surface 153a formed on the outer tooth plate 150a are engaged with a hook-shaped engagement surface 152c and a curved engagement receiving surface 153c formed on a preceding outer tooth plate 150c opposite to the outer tooth plate 150a so as to hold a chain engagement position.

Further, as shown in FIG. 5, an engagement region of the hook-shaped engagement surface 152 is formed so that when the outer tooth plate 150a and the outer tooth plate 150c engage with each other, the contact between the hook-shaped engagement surface 152a formed on the outer tooth plate 150a and a plate proximal portion side region of the curved engagement receiving surface 153c formed on the outer tooth plate 150c is avoided, while also avoiding contact between the hook-shaped engagement surface 152c formed on the outer tooth plate 150c and a plate proximal portion side region of the curved engagement receiving surface 153a formed on the outer tooth plate 150a. As a result, interference avoiding spaces O, which prevent the interference between the outer tooth plate 150a and the outer tooth plate 150c, are produced when the chain segments are engaged, so that a smooth and reliable engagement operation is realized.

The inner tooth plate 110 and the intermediate tooth plate 140 are formed as described above and include buckling limiting flat surfaces 111 and 141, hook-shaped engagement surfaces 112 and 142 and curved engagement receiving surfaces 113 and 143, respectively.

Next, an operation of the outer tooth plate 150 during engagement of a pair of corresponding segments of the engagement chain 100 will be described with reference to FIGS. 6 and 8.

Figure 6:
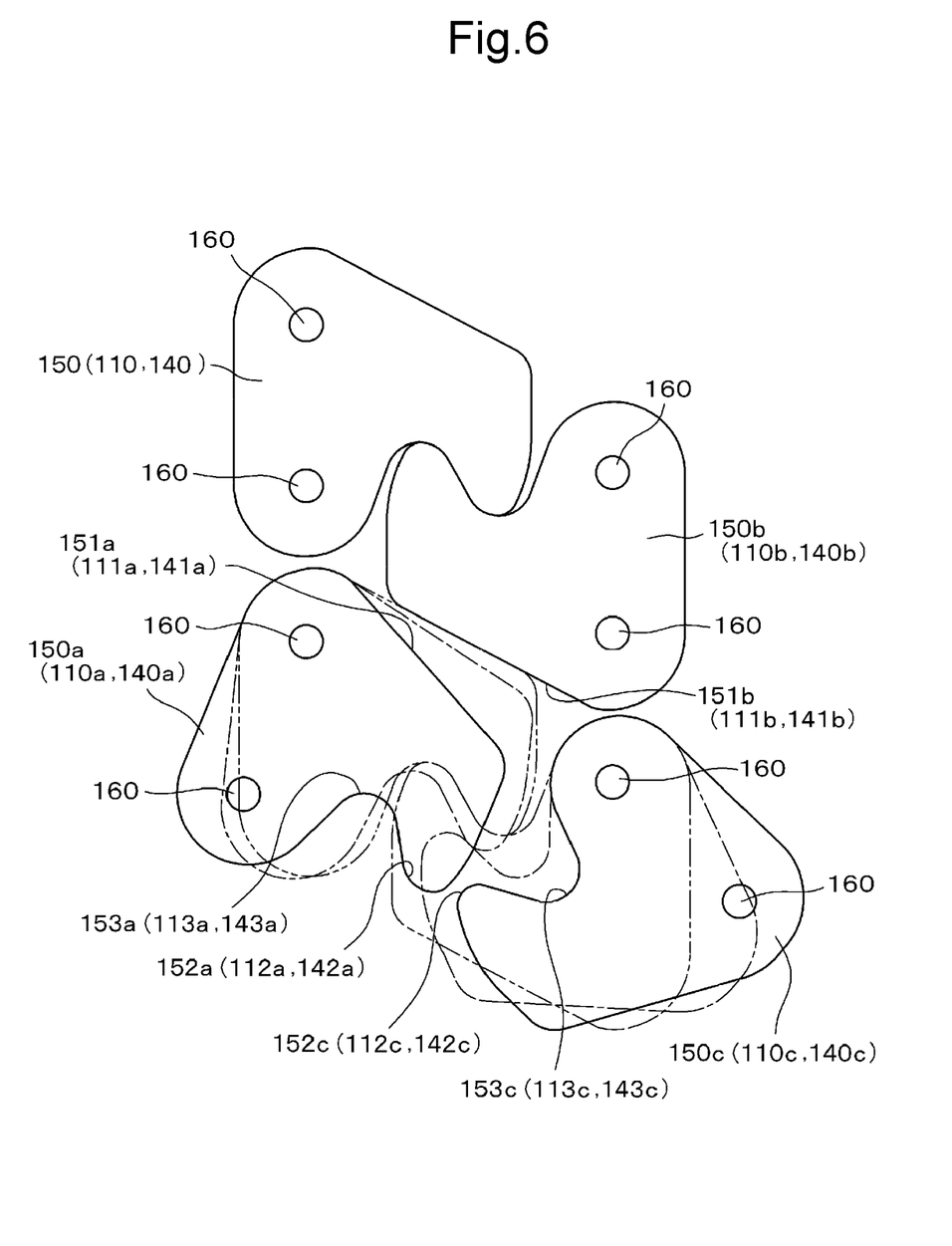
FIG. 6 is an explanatory view illustrating the initiation of the engaging process between adjacent outer tooth plates.
Figure 7:
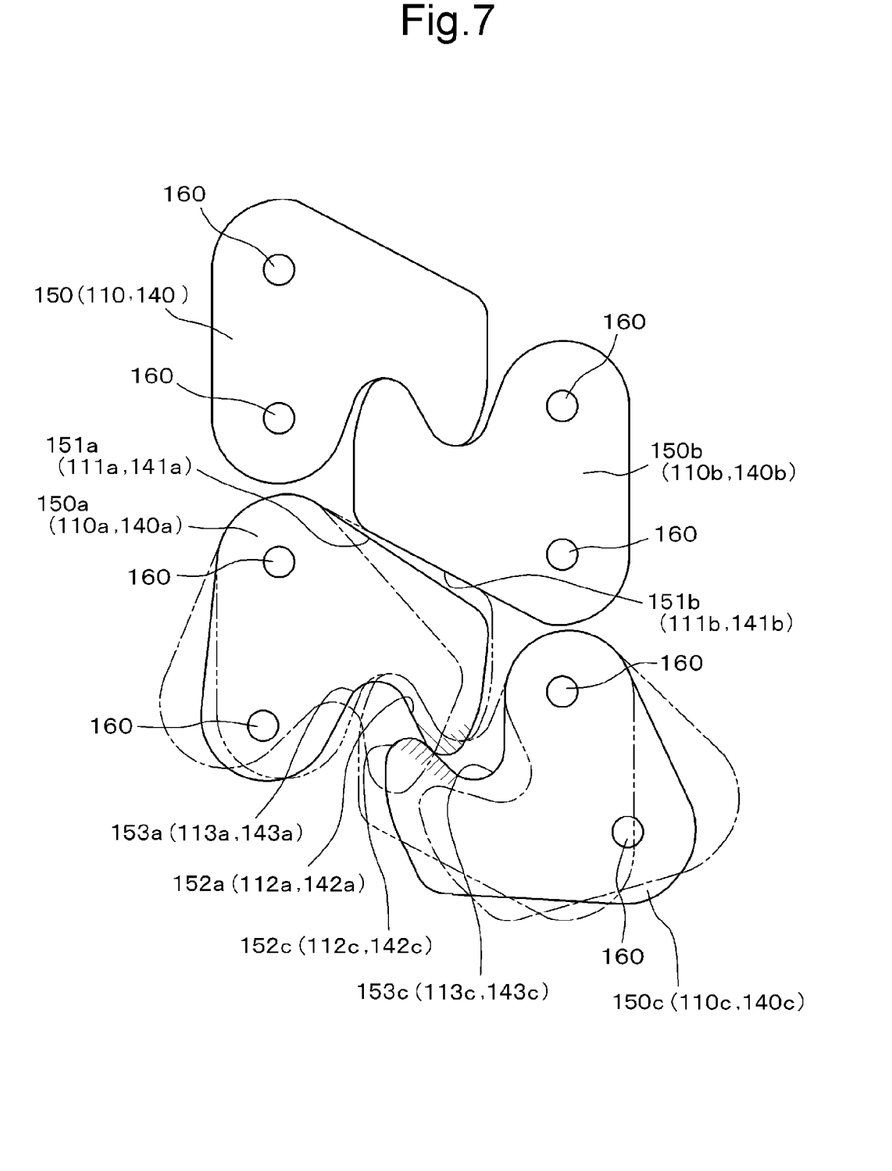
FIG. 7 is an explanatory view illustrating the engagement between adjacent outer tooth plates.

First, as shown in FIG. 6, the outer tooth plate 150a and the outer tooth plate 150c respectively rotate about press-fitted connecting pins forward in a chain advancing direction from disengagement states. Then, as shown in FIG. 7, the outer tooth plate 150a and the outer tooth plate 150c approach to each other while respectively coming into sliding contact between the hook-shaped engagement surfaces 152a, 152c and the curved engagement receiving surfaces 153a, 153c, so as to engage with each other.

Figure 8:
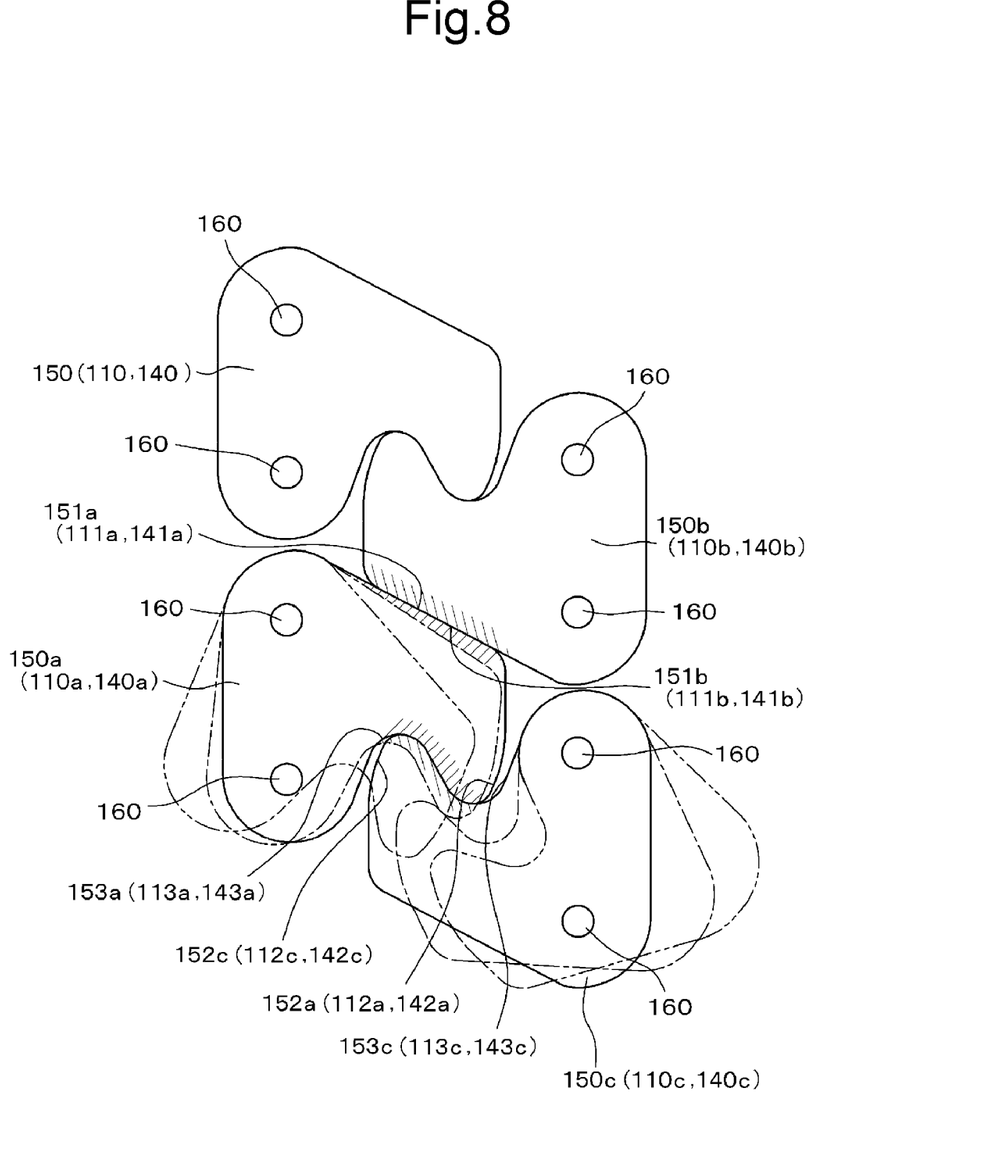
FIG. 8 is an explanatory view illustrating the engagement between adjacent outer tooth plates.

As shown in FIG. 8, the outer tooth plate 150a is positioned by causing the buckling limiting flat surface 151a to come into surface contact with the buckling limiting flat surface 151b formed on the outer tooth plate 150b, and the outer tooth plate 150a and the outer tooth plate 150c are engaged with each other by respectively engaging their hook-shaped engagement surfaces 152a, 152c and the curved engagement receiving surfaces 153a, 153c in a concave element and convex element engagement fashion.

The inner tooth plate 110 and the intermediate tooth plate 140 operate as described above.

In the engagement chains 100 of the present example, the buckling limiting flat surfaces 111, 141, and 151 respectively formed in the inner tooth plates 110, the intermediate tooth plates 140, and the outer tooth plates 150 come into surface contact with each other while inner tooth plates 110, intermediate tooth plates 140 and outer tooth plates 150 each engaged with each other by driving sprockets S, so as to form integrated chain segments are formed so as to oppose to each other.

Therefore, since compression forces between the inner tooth plates 110, the intermediate tooth plates 140, and the outer tooth plates 150 and respective relative shifts between inner tooth plates 110, intermediate tooth plates 140 and outer tooth plates 150 opposite to each other along the buckling limiting surfaces 111, the buckling limiting surfaces 141 and the buckling limiting surfaces 151 are reliably suppressed, rigidity of a pair of corresponding segments of the engagement chain 100 engaged with each other is ensured so that the buckling strength of the chain can be improved.

The chain engagement position of a pair of corresponding segments of the engagement chain 100 is linearly and reliably held even if the chains are used in a driving device in a suspended form set using a ceiling surface as a setting surface or in a driving device in a cantilever supporting form which uses a vertical wall surface as a setting surface. As a result, the stable movement forward and backward of articles can be realized.

Further, as mentioned above, since the buckling strength of a pair of corresponding segments of the engagement chain 100 is improved, the engagement chains 100 can be moved forward and backward from driving sprockets S to farther positions, and at the same time an action of a partial excessive load on the engagement chains 100 due to inclination of the engagement chains 100 can be avoided so that a chain endurance can be improved and a miniaturization of the chain size and weight reduction of the chain can be obtained.

As described above, since the compression forces between the inner tooth plates 110, the intermediate tooth plates 140, and the outer tooth plates 150 are suppressed, it is possible to prevent the generation of drive noise during a chain operation. Furthermore, since no spaces are formed between buckling limiting flat surfaces 111, 141, and 151, the entire length of the chain is maintained at a fixed length so that a positioning accuracy of articles to be driven can be improved.

Further, the bucking limiting flat surfaces 111, 141 and 151 facing each other are elastically formed so that when they are brought into surface contact with each other, they elastically deform, so as to absorb the compression forces. Therefore, the buckling limiting flat surfaces 111, 141 and 151 can be reliably brought into surface contact with each other without requiring high-precision molding of the outer shapes of the inner tooth plate 110, the intermediate tooth plate 140 and outer tooth plate 150. Thus the operation load on molding the inner tooth plate 110, the intermediate tooth plate 140 and outer tooth plate 150 can be reduced.

Further, hook-shaped engagement surfaces 112, 142 and 153 and curved engagement receiving surfaces 113, 143 and 153, are respectively formed on the inner tooth plates 110, the intermediate tooth plates 140 and the outer tooth plates 150. Therefore, the hook-shaped engagement surfaces 112, 142 and 152 and the curved engagement receiving surface 113, 143 and 153 are engaged with each other in a concave element and convex element engagement fashion when a corresponding pair of chain segments are engaged with each other. Thus the adjacent inner tooth plates 110, the adjacent intermediate tooth plates 140 and the adjacent outer tooth plates 150 are reliably engaged with each other so that a rigidity of the engagement chain can be ensured.

Engagement regions, which produce interference avoiding spaces O, are formed on the hook-shaped engagement surfaces 112, 142 and 152, so as to prevent interference between the hook-shaped engagement surfaces 112, 142 and 152 and the curved engagement receiving surfaces 113, 143 and 153 at the time of starting of engagement of a pair of corresponding segments of the engagement chain 100. Thus, even if the inner tooth plates 110, the intermediate tooth plates 140 and the outer tooth plates 150 are formed so that a space between buckling limiting flat surfaces facing each other is lost, smooth and reliable engagement operations of adjacent inner tooth plates 110, adjacent intermediate tooth plates 140 and adjacent outer tooth plates 150 can be ensured. Therefore the effects of the present invention are very large.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, the number inner link units arranged in parallel with each other in the chain width direction in an engagement chain of the present invention may include a single inner link unit or a plurality or inner link units. And in the case where the plurality of inner link units are arranged in the chain width direction, since an outer tooth plate and an inner tooth plate forming one of a pair of engagement chains, the engagement between the chains may be ensured across the entire width, so that buckling can be suppressed the chain width direction of the engagement chain and chain endurance can be realized. Furthermore, the engagement balance with a driving sprocket in the chain width direction can be improved.

Although one configuration is described above, any variety of shapes of inner tooth plates, outer tooth plates, and intermediate tooth plates may be used in an engagement chain of the present invention, so long as the same kinds of plates facing each other are capable of being engaged with each other.

Any variety of bushes may be used in the engagement chain of the present invention. More specifically, any bushes such as a general shaped bush, a bush, which is obtained by integrally molding a plate side press-fitted portion, press-fitted in an inner tooth, with a sprocket engagement portion of a larger diameter than the plate side press-fitted portion, and the like may be adopted. When a bush comprising the plate side press-fitted portion and the sprocket engagement portion is adopted, the bush comes into stable contact with a driving sprocket by a specified outer circumferential surface of the sprocket engagement portion. Thus a problem that the central axis of a roller is off-set with respect to the central axis of a connecting pin or a bush at the time of engagement with the driving sprocket so that contact vibration and contact noise which is liable to occur between the roller and the driving sprocket as in the use of the roller can be prevented. A roller used in a sprocket engagement may also be integrally molded with the bush so that a sufficient wall thickness can be ensured. Thus a high load resistance may be maintained when heavy articles or the like are driven.

Finally, in an engagement chain-incorporated engagement chain type driving device according to the present invention, even if a setting surface is a floor surface, which is a setting form and a setting form is a ceiling surface, which is a suspended setting form, there is no problem in hoisting and lowering operations. Further, even if the setting surface is a vertical wall surface, which is a cantilever supporting form, there is no problem in operations of movements forward and backward corresponding to the above-mentioned hoisting and lowering operations.

What is claimed is:

1. An engagement chain including a plurality of chain segments, each segment comprising:
   at least one inner link unit, each inner link unit comprising a pair of right and left hook-shaped inner tooth plates, each having front and rear pin holes, and a pair of front and rear bushes press-fitted into said inner tooth plates, so that the pair of right and left hook shaped inner tooth plates are connected to each other in a longitudinal direction; and hook-shaped outer tooth plates disposed on the outermost sides of the chain in the chain width direction, the outer tooth plates each having front and rear pin holes and being connected to the at least one inner link unit by pairs of front and rear connection pins press fitted into pairs of front and rear pin holes of the hook-shaped outer tooth plates and the front and rear pin holes of the hook-shaped inner tooth plate,
   wherein the inner tooth plates and outer tooth plates of corresponding segments of the chain oppose to each other when driven by a pair of driving sprockets which engage with the bushes, and become respectively engaged with the inner tooth plates and outer tooth plates of the opposing chain segment in a half pitch-shifted state in a longitudinal direction of the chain so that the corresponding chain segments are integrated with each other, and wherein the inner tooth plates and the outer tooth plates are respectively disengaged from each other and branched by said pair of driving sprockets, and wherein the inner tooth plates and outer tooth plates each include a hook-shaped engagement surface and a curved engagement receiving surface, wherein the hook-shaped engagement surface and curved engagement receiving surface engage or opposing plates engage each other when engaged by the driving sprockets;

wherein a series of engagement regions are formed on at least one of the hook-shaped engagement surfaces or curved receiving surfaces, wherein interference avoiding spaces are formed so as to prevent interference between engaged inner tooth plates and between outer tooth plates, the interference avoiding spaces also being formed such that when opposing outer tooth plates engage with each other, there is no contact between a convex shaped portion of the hook-shaped engagement surface and a concave shaped plate proximal side region of the curved engagement receiving surface; and wherein a buckling limiting flat surface is formed on each of the inner tooth plates and outer tooth plates so as to hold a chain engagement position, and wherein the buckling limiting flat surfaces are bulgingly formed so as to elastically deform when adjoining chain segments are brought into surface contact with each other when the adjoining chain segments are integrated with corresponding segments by the driving sprockets.

2. The engagement chain according to claim 1, wherein a plurality of said inner link units is disposed in a chain width direction.

3. The engagement chain according to claim 1, wherein the inner tooth plates and outer tooth plates each include a hook-shaped engagement surface and a curved engagement receiving surface, wherein the hook-shaped engagement surface and curved engagement receiving surface engage or opposing plates engage each other when engaged by the driving sprockets.

4. An engagement chain including a plurality of chain segments, each segment comprising:

at least one inner link unit, each inner link unit comprising a pair of right and left hook-shaped inner tooth plates, each having a front and rear pin hole and a hook-shaped engagement surface and a curved engagement receiving surface, and a pair of front and rear bushes press-fitted into said inner tooth plates, so that the pair of right and left hook-shaped inner tooth plates are connected to each other in a longitudinal direction; and hook-shaped outer tooth plates disposed on the outermost sides of the chain in the chain width direction, the hook-shaped outer tooth plates each having a front and rear pin hole and a hook-shaped engagement surface and a curved engagement receiving surface and being connected to the at least one inner link unit by pairs of front and rear connection pins press-fitted into pairs of front and rear pin holes of the hook-shaped outer tooth plates and the front and rear pin holes of the hook-shaped inner tooth plate, wherein the inner tooth plates and outer tooth plates of corresponding segments of the chain oppose to each other when driven by a pair of driving sprockets which engage with the bushes, and become integrated in a half pitch-shifted state in a longitudinal direction of the chain so that the hook-shaped engagement surfaces of the inner tooth plates and outer tooth plates corresponding to the curved engagement receiving surfaces of opposing chain segments engage each other, and wherein the inner tooth plates and said outer tooth plates are subsequently disengaged from each other and branched by the pair of driving sprockets, wherein the hook-shaped engagement surface and curved engagement receiving surface engage or opposing plates engage each other when engaged by the driving sprockets;

wherein a series of engagement regions are formed on at least one of the hook-shaped engagement surfaces or curved receiving surfaces, wherein interference avoiding spaces are formed so as to prevent interference between engaged inner tooth plates and between outer tooth plates, the interference avoiding spaces also being formed such that when opposing outer tooth plates engage with each other, there is no contact between a convex shaped portion of the hook-shaped engagement surface and a concave shaped plate proximal side region of the curved engagement receiving surface, and wherein a buckling limiting flat surfaces is formed on each of the inner tooth plates and outer tooth plates so as to hold a chain engagement position, and wherein the buckling limiting flat surfaces of are bulgingly formed so as to elastically deform when adjoining chain segments are brought into surface contact with each other when the adjoining chain segments are integrated with corresponding segments by the driving sprockets.

* * * * *